Feb. 25, 1930. LA VERNE F. WERTZ 1,748,262
AEROPLANE CONSTRUCTION
Filed Jan. 4, 1929   2 Sheets-Sheet 1
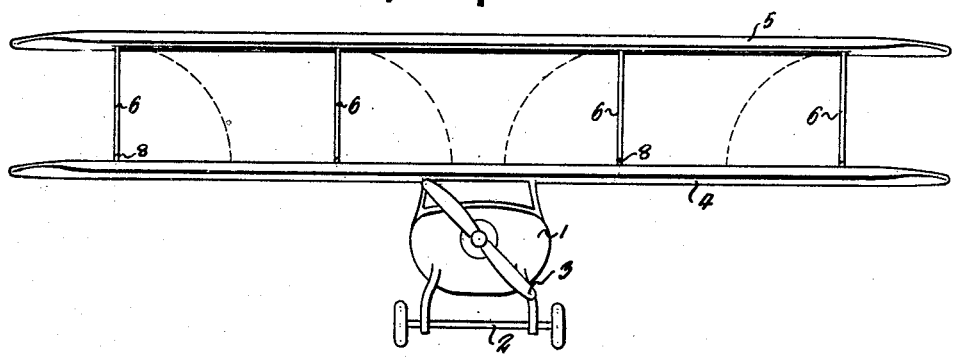
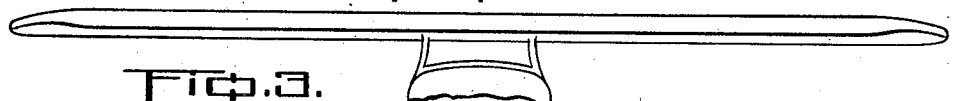
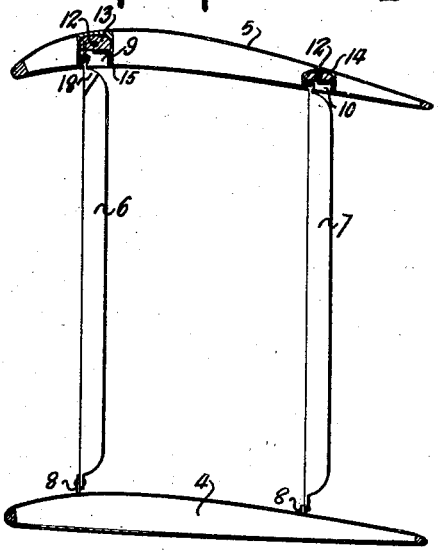
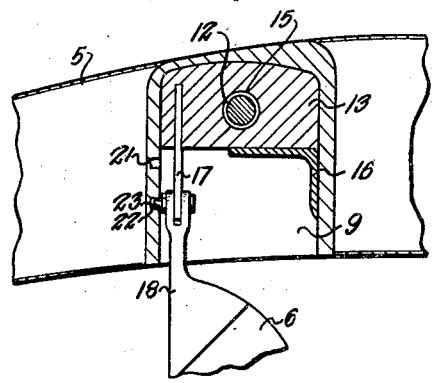
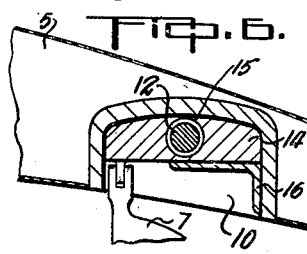
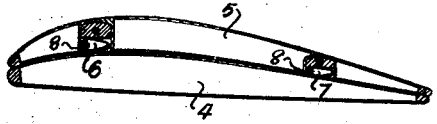
Inventor
La Verne F. Wertz

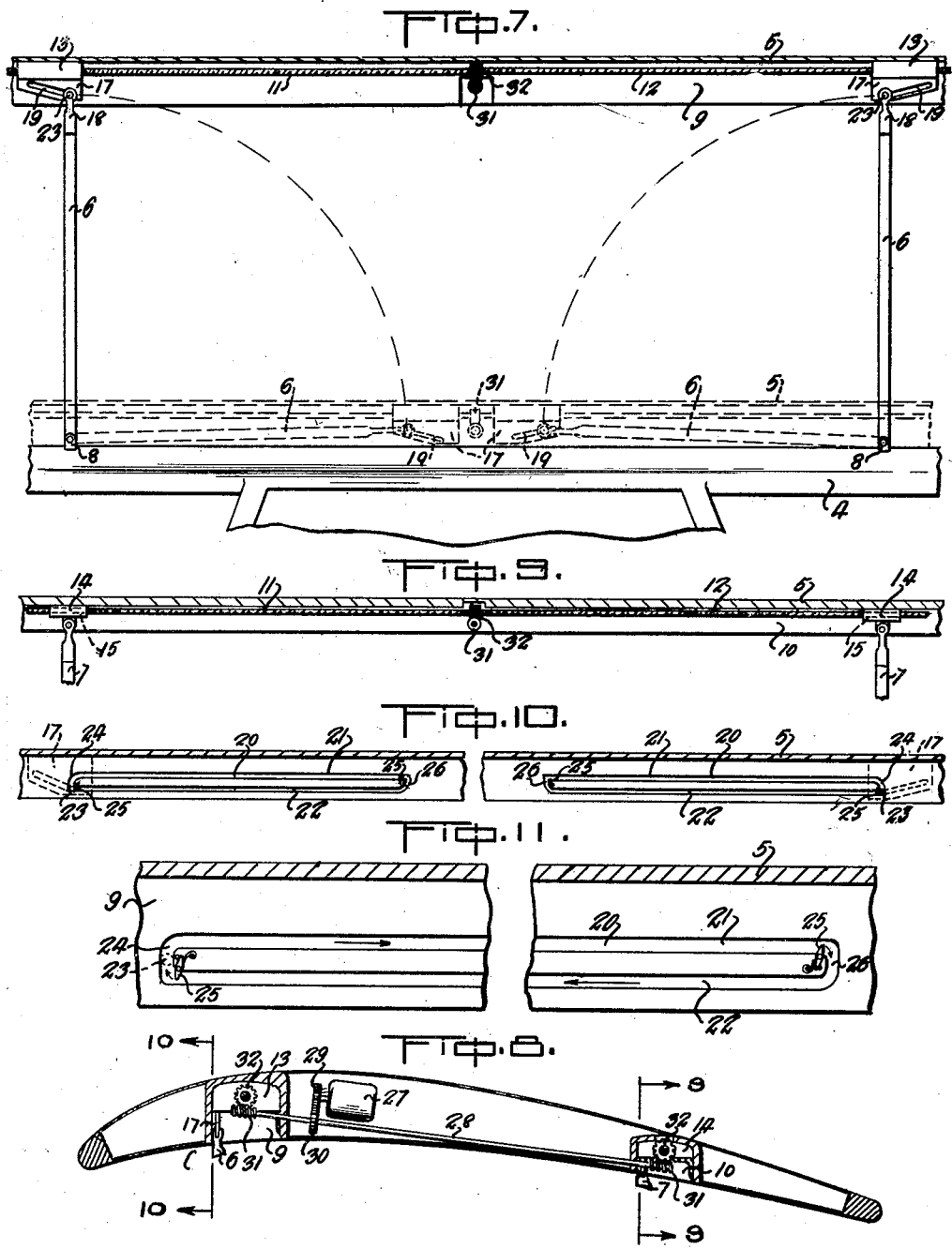

Patented Feb. 25, 1930

1,748,262

UNITED STATES PATENT OFFICE

LA VERNE FRANKLIN WERTZ, OF BUFFALO, NEW YORK

AEROPLANE CONSTRUCTION

Application filed January 4, 1929. Serial No. 330,225.

My invention relates to improvements in aeroplane construction and the object of the invention is to provide an improved wing structure wherein the area of wing surfaces may be readily altered to suit various flight conditions. It is a matter of common knowledge that a large amount of wing surface creates a considerable resistance and impedes the progress of the machine at high speeds, whilst conversely, a large wing surface greatly increases the lift at lower speeds. A particular object of my invention is therefore to provide a means whereby a comparatively large wing surface may be used in taking off and landing, and a smaller wing surface used in direct flight, in order to secure the maximum speed.

A further object of my invention is to provide my aircraft with a rigid and also a moveable wing which is adapted to be superimposed upon and superposed with respect to the rigid wing, swingable struts being provided as a means for actuating the moveable wing into the superimposed and superposed positions.

Another object of my invention is to provide a mechanism for altering the angle of incidence of the moveable wing before it is moved through the medium of the swingable struts.

My invention consists of improvements in aeroplane construction designed and arranged all as hereinafter more particularly described and illustrated in the accompanying drawings, in which:

Figure 1 is a front elevational view of an aircraft embodying my improved construction, the moveable wing being shown in the superposed position.

Figure 2 is a front elevational view of the wing portions of the aircraft as illustrated in Figure 1, showing the moveable wing in the superimposed position.

Figure 3 is an enlarged cross sectional view through the wings in the superposed position.

Figure 4 is a similar view to Figure 3 showing the wings in the superinposed position.

Figure 5 is a further enlarged cross sectional view of a fragmentary forward portion of the moveable wing showing the sliding connection of one of the forward struts therewith.

Figure 6 is a similar fragmentary sectional view of a rear portion of the moveable wing showing the sliding connection of one of the rear struts therewith.

Figure 7 is a front elevational view of the center portion of my aircraft showing the wings in the superposed position, in full lines, and in the superimposed position in dotted lines, the moveable wing being shown in section in the superposed position.

Figure 8 is a transverse sectional view through the moveable wing.

Figure 9 is a longitudinal sectional view of a fragmentary wing portion taken through the line 9—9 Figure 8.

Figure 10 is a longitudinal sectional view of a fragmentary wing portion taken through the line 10—10 Figure 8, and Figure 11 is an enlarged fragmentary view of the left hand portion of the wing illustrated in Figure 10.

Like characters of reference indicate corresponding parts in the different views.

For the general purpose of explaining the present invention, the aeroplane illustrated in Figure 1 may be broadly described as comprising a fuselage 1, landing gear 2, propeller 3, and wing 4 of the monoplane type.

My auxiliary or moveable wing 5 is positioned above the wing 4, being in either of the positions illustrated in Figures 1 and 2 when the machine is in flight. In Figure 1 it is shown in the superposed position in which the machine is converted into a biplane for taking off or landing, and in Figure 2 the moveable wing is shown in the superimposed position wherein the machine is of the monoplane type for fast flight.

For actuating the moveable wing towards and away from the rigid wing, I utilize a plurality of sets of swingable struts 6 and 7. These struts are pivoted at their lower ends upon lugs 8 which extend upwardly from the upper face of the rigid wing, and at their upper ends are slidable in the moveable channels 9 and 10 in the lower face of the moveable wing.

Extending through each channel, I furnish a pair of worm shafts 11 and 12, the shafts 11 extending from one side of the center line, and the shafts 12 extending on the other side of the center line. The upper ends of the sets of struts 6 and 7 are each pivotally connected to sliding blocks 13 and 14 which are slidable in the channels 9 and 10 and formed with longitudinal threaded orifices 15 through which the worm shafts 11 and 12 extend. When the worm shafts are rotated in one direction, the blocks 13 and 14 which are threaded thereon move towards the center and swing the struts downwardly thus causing the approach of the moveable wing towards the fixed wing, and when the worm shafts are rotated in opposite direction the blocks are moved away from the center line causing the struts to swing upwardly with the consequent raising away of the moveable wing from the rigid wing. For slidably retaining the blocks 13 and 14 in the channels, I provide angle pieces 16 which are attached to one side of the channels and extend underneath the blocks.

Upon reference to Figures 5 and 7 of the drawings, it will be seen that I do not pivotally connect the upper ends of the struts 6 directly with the blocks 13 but provide plates 17 extending downwardly from the blocks and to which the upper ends 18 of the front struts are slidably connected. These plates are formed with upwardly inclined slots 19 in which the ends 18 of the struts are adapted to slide. This construction is provided as a means for altering the angle of incidence of the moveable wing before it is actuated into one position or the other. When the machine is taking off the moveable wing is in the superposed position as illustrated in Figure 7 and having the usual angle of incidence from 5 to 12 degrees. When it is desired to actuate the moveable wing into the superimposed position, it is preferable to alter the angle of incidence to practically zero so that the lift is taken from such moveable wing which will of course permit the use of a less force in moving it downwardly towards the rigid wing.

As the blocks 13 move towards the center line, the struts 6 will at first not swing downwardly but their upper ends will slide upwardly along the slots 19 in the plates 17 thus swinging the wing down and bringing its angle of incidence to practically zero. When the tops of the struts 6 have reached the upper ends of the slots 19 the struts will then of course swing under the influence of the moving blocks and the moveable wing will as a whole approach the rigid wing.

For insuring the movement of the strut 6 within the slots 19 before such struts swing downwardly I furnish substantially rectangular slots 20 in the front face of the channel 9, such slots being each of a length corresponding in distance and position to the travel of each one of the blocks 13, the distance between the upper and lower portions 21 and 22 of such slots being equal to the upward swinging movement of the moveable wing when the angle of incidence has been altered through the movement of the upper ends of the struts 6 along the inclined slots 19. In Figure 10 I have shown a pair of these slots, one slot being formed to register with a clock-wise movement of one of the struts 6 and the other with an anti-clockwise movement of one of the other struts 6. The pins 23 which extend from the top of the struts 6 through the slots 19 in the plates 18 also are adapted to extend into the slots 21 as illustrated in Figure 5 and to travel around such slots as the moveable wing is raised and lowered.

When the moveable wing is in the superposed position as illustrated in Figure 7 with the struts 6 at the bottoms of the slots 19, the pins 23 and the plates 18 are in the relative positions to the slots as illustrated in Figure 10, the pins 23 in this figure are in the upwardly extending portions 24 of the slots 20 and held against swinging movement through the engagement of the pins 23 with the vertical slot portions 24, and as the inward movement of the blocks 13 cause the angle of incidence to approach zero through the sliding of the pins 23 in the slots 19, such pins will reach the top of the slot portions 24 wherein the struts 6 will be permitted a swinging movement under the influences of the inwardly moving blocks.

When the moveable wing reaches the superimposed position illustrated in dotted lines in Figure 7, the struts 6 and 7 will be contained in the channels 9 and 10 and inclined to a slight degree. When it is desired to raise the moveable wing the worm shafts 11 and 12 are rotated in the opposite direction which will move the blocks 13 outwardly and cause the upper ends of the struts 6 to slide towards the lower ends of the slots 19 thus moving the pins 23 through the downward portions 26 of the slots 20 and bringing them back into the lower portions 22 of the slots.

As an aeroplane in its flight creates an air suction upon the top surfaces of its wings it will be readily apparent that when the worm shafts 11 and 12 are unscrewed that the moveable wing will quickly raise itself up and the suction in conjunction with the screw actuated movement of the sliding blocks restore such moveable wing into the position illustrated in Figures 1 and 7.

For actuating the worm shafts 11 and 12 any suitable means may be provided such as that illustrated in Figure 8 wherein I employ an electrical motor 27 which actuates a drive shaft 28 through the medium of gears 29 and 30, such drive shaft being connected by means of worms 31 with worm wheels 32 between the worm shafts 11 and 12. If the wings of the machine are of V shape it will be impractical to have the worm shafts 11 and 12 in rigid alignment, but this can be easily overcome by the use of universal joints connecting the worm wheels 31 with such worm shafts.

From the foregoing description it will be apparent that I have devised a particularly simple construction for providing an increased wing area for landing and taking off purposes which is of simple and positive form and capable of being easily and quickly actuated.

What I claim as my invention is:

1. In an aeroplane, a substantially rigid wing therefor, a second wing moveable into position respectivly superimposed upon and superposed with respect to the rigid wing, sets of front and rear struts extending from the rigid wing and upon which the second wing is carried, means for swinging said struts to move such second wing into the superimposed and superposed positions, and means independent of the swinging movement of the front struts for altering the angle incidence of the second wing.

2. In an aeroplane, a substantially rigid wing therefor, a second wing moveable into position respectively superimposed upon and superposed with respect to the rigid wing, struts pivoted at their lower ends upon the rigid wing and slidably connected at their upper ends to the second wing, and means for swinging said struts about their pivotal points to slide in respect to said second wing to move it into the superimposed and superposed positions.

3. In an aeroplane, a substantially rigid wing therefor, a second wing moveable into position respectively superimposed upon and superposed with respect to the rigid wing, struts pivoted at their lower ends upon the rigid wing and slidably connected at their upper ends to the second wing, a plurality of worm shafts contained within the second wing, a plurality of sliding blocks having threaded orifices therein through which such worm shafts pass, and to which the upper ends of the struts are pivotally connected, and means for rotating said worm shafts to slide the blocks and swing the struts towards and away from the rigid wing.

4. In an aeroplane, a substantially rigid wing therefor, a second wing moveable into position respectively superimposed upon and superposed with respect to the rigid wing, struts pivoted at their lower ends upon the rigid wing and slidably connected at their upper ends to the second wing, a plurality of worm shafts contained within the second wing, a plurality of sliding blocks having threaded orifices therein through which such worm shafts pass, members extending from said blocks and having upwardly inclined slots therein, pins upon the upper ends of the struts projecting into said slots so that a sliding and pivotal connection is formed between the struts and the blocks, means for rotating the worm shafts to move the blocks inwardly to swing the struts towards the rigid plane, and means for retaining the struts against a swinging movement under the sliding movement of the blocks until the strut pins have slid to the upper ends of the slots.

LA VERNE FRANKLIN WERTZ.